(12) United States Patent  
Berra

(10) Patent No.: US 7,204,559 B2  
(45) Date of Patent: Apr. 17, 2007

(54) DEVICE FOR LOCKING THE LEGS OF A PASSENGER IN A SEAT

(75) Inventor: Eric Berra, Choëx (CH)

(73) Assignee: Bolliger & Mabillard Ingenieurs Conseils S.A., Monthey (SE)

( * ) Notice: Subject to any disclaimer, the term of this patent is extended or adjusted under 35 U.S.C. 154(b) by 61 days.

(21) Appl. No.: 10/021,918

(22) Filed: Dec. 13, 2001

(65) Prior Publication Data

US 2002/0070599 A1    Jun. 13, 2002

(30) Foreign Application Priority Data

Dec. 13, 2000    (CH)  ................................. 2427/00

(51) Int. Cl.  
*B60R 21/00*    (2006.01)

(52) U.S. Cl. .................. 297/466; 297/486; 297/487; 105/149.2; 128/882

(58) Field of Classification Search ................ 297/466, 297/484, 486; 105/149.1, 149.2 X; 5/648, 5/650; 128/882 X; 602/23, 26, 27, 62; 472/43, 472/59  
See application file for complete search history.

(56) References Cited

U.S. PATENT DOCUMENTS 3,901,550 A  *  8/1975  Hamy ................... 297/486 X
4,359,200 A  *  11/1982  Brevard et al.
4,732,381 A  *  3/1988  Skowronski
5,272,984 A  *  12/1993  Bolliger et al.
5,342,116 A  *  8/1994  Walton ....................... 297/466
5,791,254 A  *  8/1998  Mares et al. ................. 104/53
6,098,549 A  *  8/2000  Mares .......................... 104/76
6,123,392 A  *  9/2000  Alfred et al. ............... 297/466
6,349,993 B1 *  2/2002  Walsh ......................... 297/466

FOREIGN PATENT DOCUMENTS

| EP | 1020212 A | 7/2000 |
| FR | 2076427 A | 10/1971 |
| JP | 08257084 A | 2/1997 |
| WO | WO 9922830 A | 5/1999 |

* cited by examiner

*Primary Examiner*—Anthony D. Barfield  
(74) *Attorney, Agent, or Firm*—Clifford W. Browning; Krieg DeVault LLP

(57) ABSTRACT

The device, intended in particular for a seat on an installation for amusement parks, has two flaps (10, 10') mounted for articulation at the end of the support (6) of the base (7) of the seat.

16 Claims, 10 Drawing Sheets

DEVICE FOR LOCKING THE LEGS OF A PASSENGER IN A SEAT

BACKGROUND OF THE INVENTION

1. Field of the Invention

The present invention relates to a device for locking the legs of a passenger in a seat, in particular a seat on an installation for amusement parks.

2. Description of Related Art

Various installations are found in amusement parks where vehicles travel in which passengers sit in order to live a novel experience and to have unusual emotions and sensations.

These installations offer a very broad range of sensations ranging from a simple ride, sometimes surprising in ghost trains, to aerial acrobatic figures afforded by roller coasters.

The devices for holding passengers in the seats of the vehicles travelling in these installations are adapted to the speeds and accelerations to which the passengers are subjected. Thus roller coasters are provided with retaining devices including harnesses which constitute veritable yokes which encircle the body of the passenger so as to prevent any risk of ejection of the passenger during travel.

In a particular embodiment of suspended roller coasters, the passengers travel along the circuit, with their backs disposed substantially parallel to the track formed by the rails. Such installations are described in particular in the international patent application publications WO 99/22829 and WO 99/22830. Because of the position occupied by the passengers in these installations, it is necessary not only for the passenger to be held with regard to his body but also to lock his legs.

To this end, the devices proposed in the prior international applications mentioned above propose a device for locking the legs fixed to an element mounted for tilting on the bottom part of the seat support. Amongst other drawbacks, such a device is bulky since it requires an extension of the seat support downwards in order to serve as a support for tilting.

The aim of the present invention is to propose a device for holding the legs of the passenger which remedies the drawbacks of known devices, which is simple to produce, whilst allowing great safety and great comfort for the passenger.

SUMMARY OF THE INVENTION

To this end, the invention relates to a device for locking the legs of a passenger in a seat, in particular a seat on an installation for amusement parks, said seat comprising a base of the seat fixed on a support, said device comprising two flaps mounted for articulation at the end of the support of the base of the seat. It also relates to a seat for the transportation of a passenger, in particular in installations for amusement parks, having a said device for locking the legs of the passenger in a seat.

BRIEF DESCRIPTION OF THE DRAWINGS

The following description, given by way of example, refers to the drawing, in which.

DETAILED DESCRIPTION OF THE PREFERRED EMBODIMENTS

Figure 1:
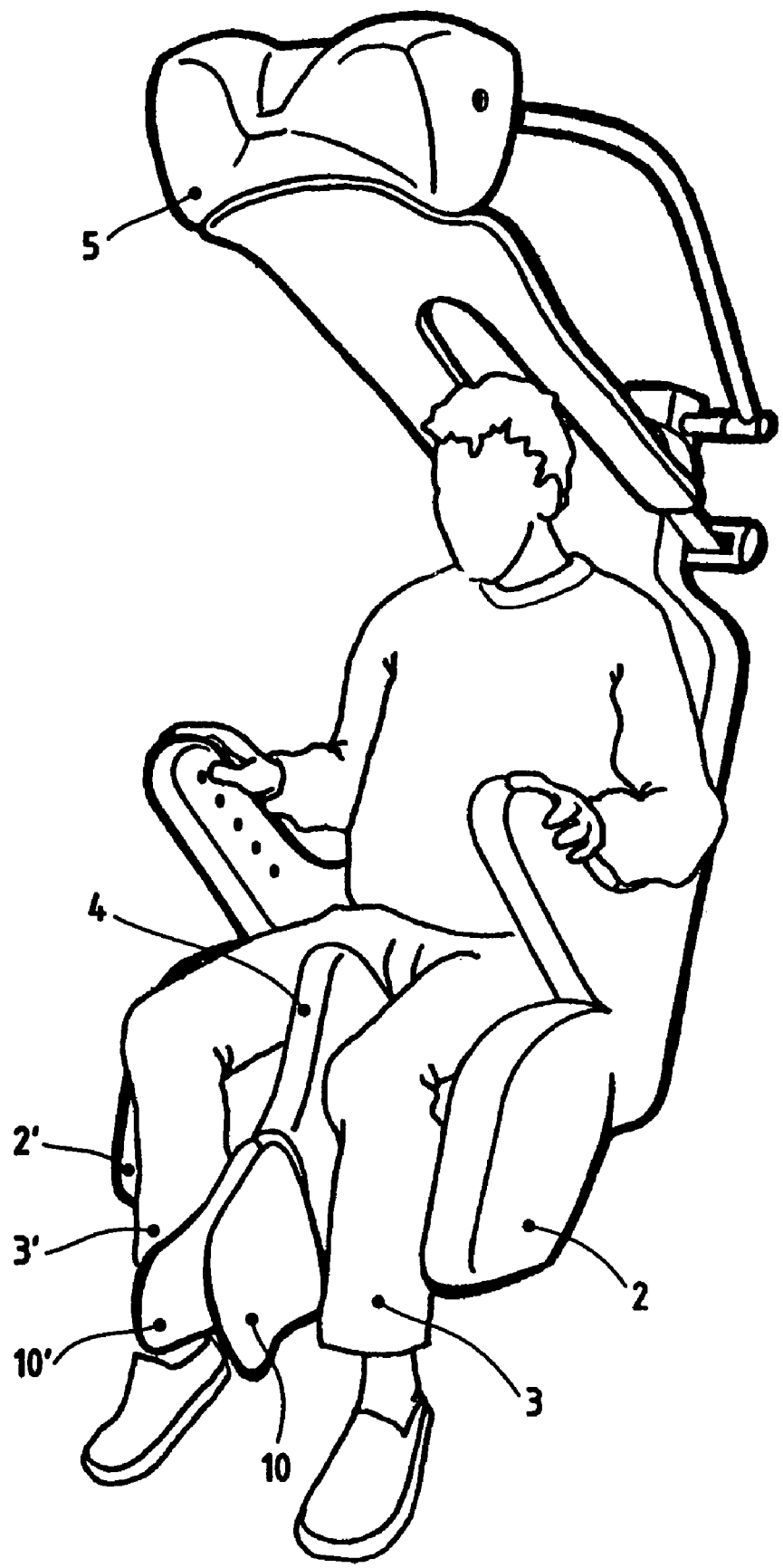
FIG. 1 is a three-quarter perspective front view of a schematic example of a seat including an example of a locking device according to the invention in the open position.
Figure 2:
FIG. 2 is a three-quarter front perspective view of the seat of FIG. 1, the locking device being shown in the closed position.

FIGS. 1 and 2 depict a seat having a device for locking the legs of a passenger according to the invention. The seat comprises a base constituting the squab part proper of the seat and having a central protrusion 4 in the shape of a camel's hump, arranged so as to cooperate with the cushion 5 of a harness and lateral parts 2, 2' extending below the seat and serving for the lateral holding of the legs 3, 3' of the passenger. The locking of the legs 3, 3' is achieved by means of two flaps 10, 10' mounted articulated at the end of the support of the seat base. When they are in the closed position, these flaps cooperate with the base of the seat and in particular with its lateral parts 2, 2' so as to encircle the legs 3, 3' of the passenger seated in the seat.

A first example embodiment of the opening/closing mechanism of the device is depicted in FIGS. 3 to 6. This mechanism can be mounted for example inside a beam disposed in line with the support of the seat base, at its middle part, so as to project between the legs of the passenger. This mechanism comprises a pedal 11 fixed to a lever 12 mounted for articulation about a horizontal shaft 13 fixed to the support 6 of the seat base 7. The bottom end of the lever 12 is fixed to a horizontal shaft 15 which can slide inside the support 6 of the seat base so as to actuate the movement of closing/opening of the flaps 10, 10'. The lever 12 has a lug 14 projecting towards the rear and mounted for articulation at the end 21 of a hydraulic jack 20 for locking the device.

Figure 3:
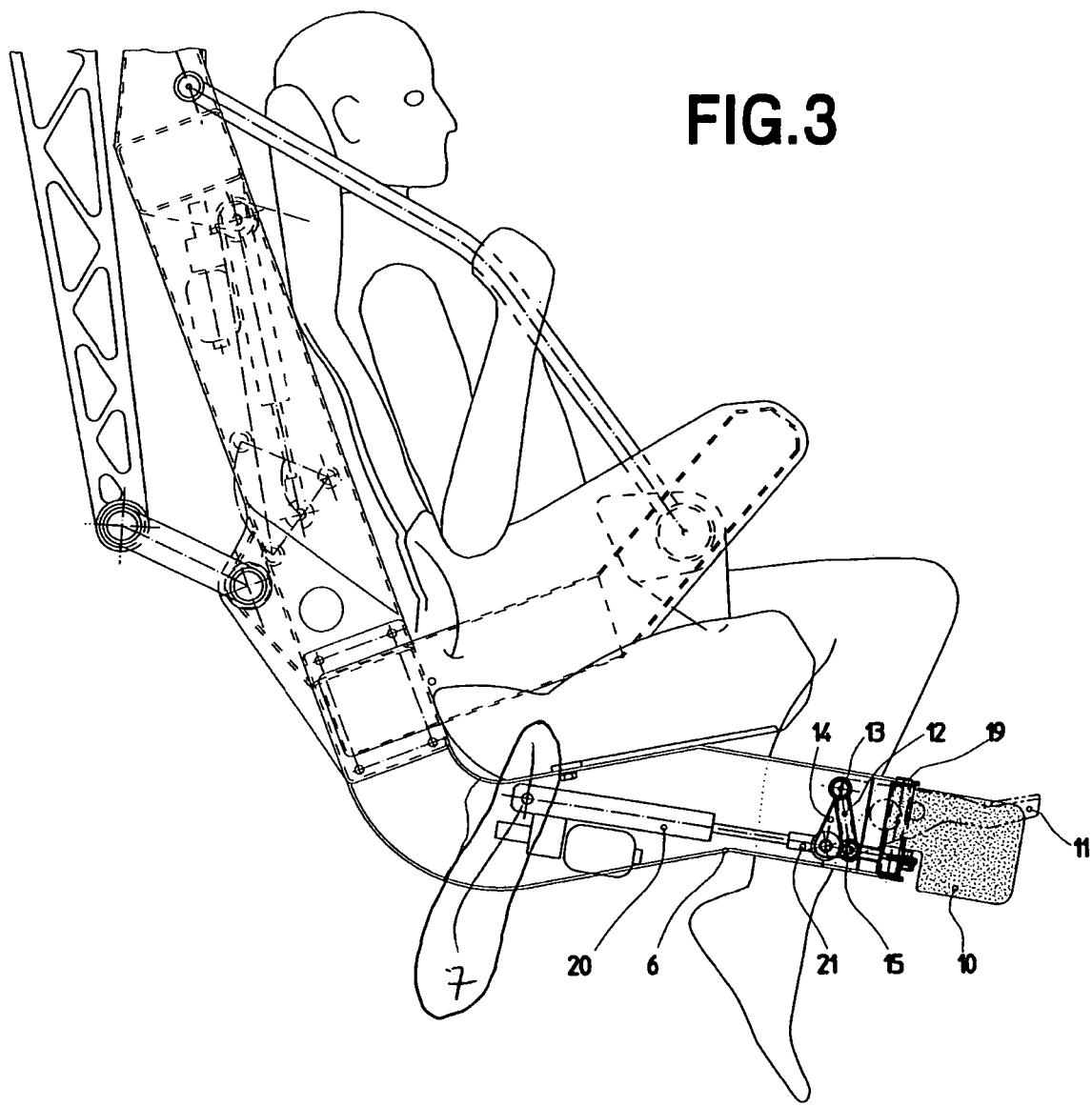
FIG. 3 is a side view partially in cross-section of a seat including a locking device according to the invention in the open position and illustrating one example embodiment of the opening/closing mechanism of the said device.
Figure 4:
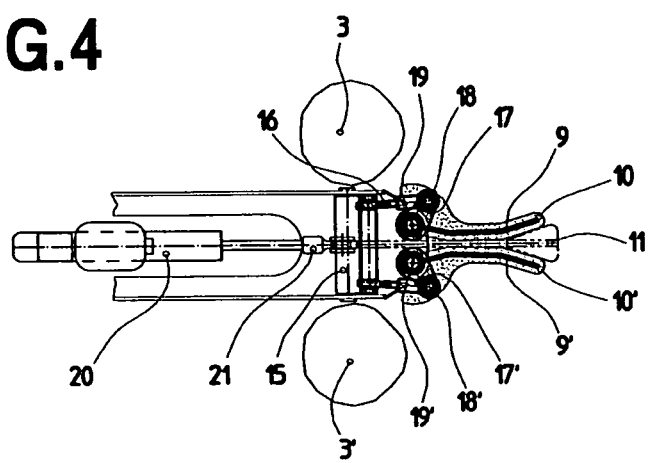
FIG. 4 is a partial section seen from above of the locking device depicted in FIG. 3.
Figure 5:
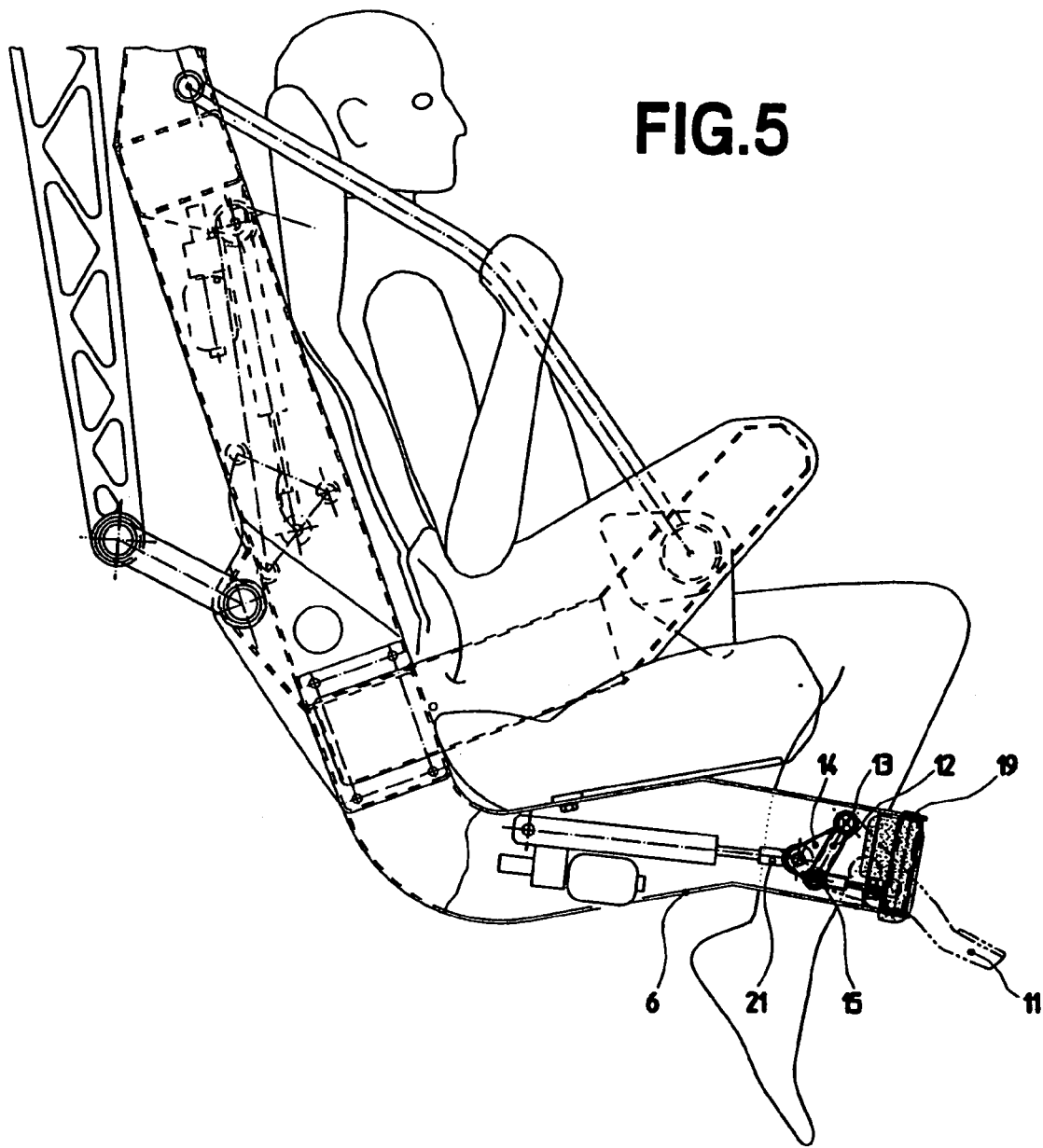
FIG. 5 is a side view similar to that of FIG. 3, the locking device being shown in the closed position.
Figure 6:
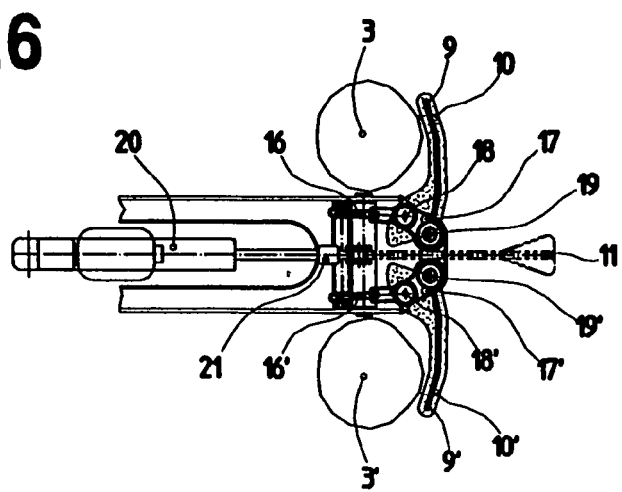
FIG. 6 is a partial section seen from above of the locking device depicted in FIG. 5.
Figure 7:
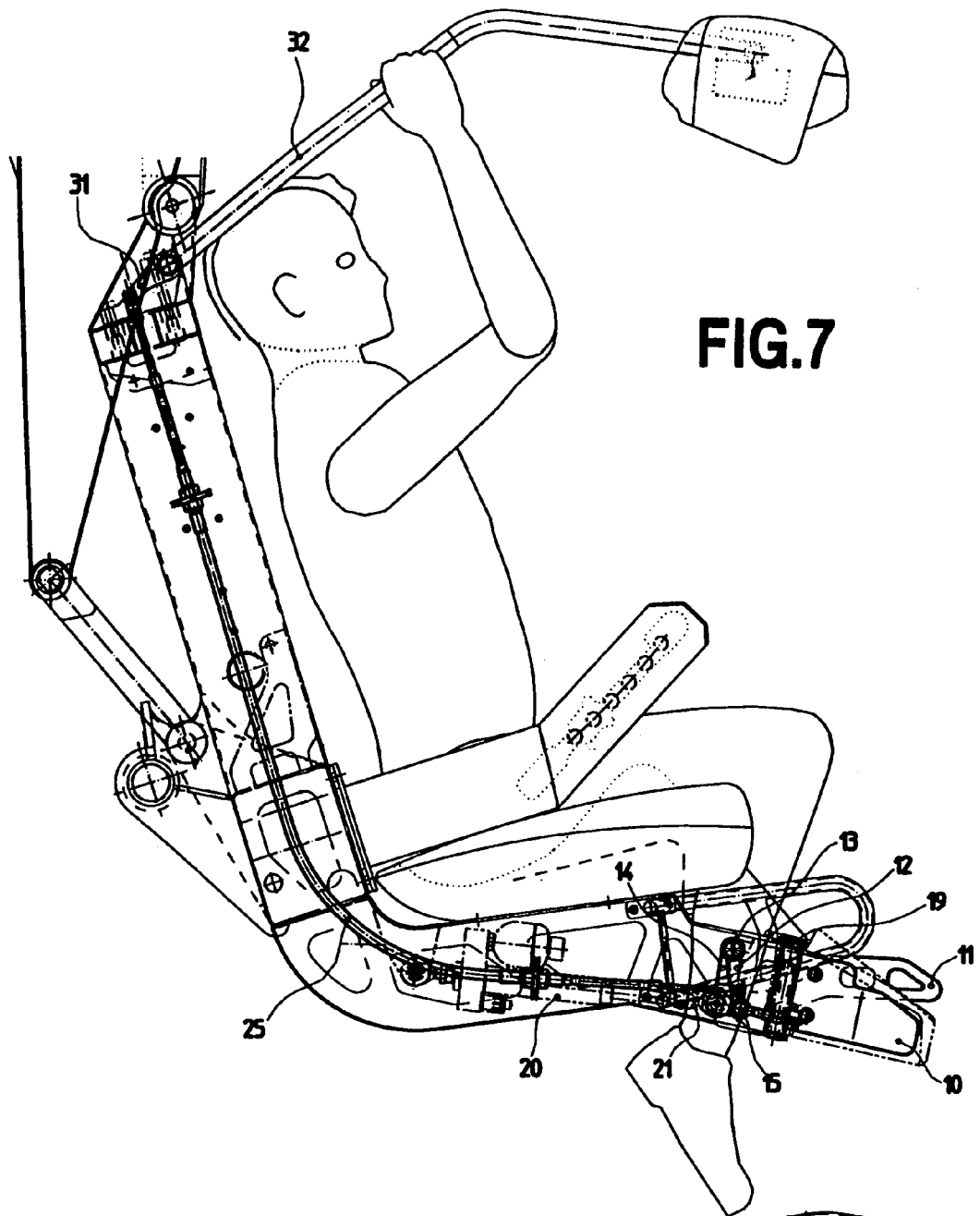
FIG. 7 is a side view partially in cross-section of a seat having a locking device according to the invention in the open position and illustrating a first variant embodiment of the opening/closing mechanism of the said device.
Figure 8:
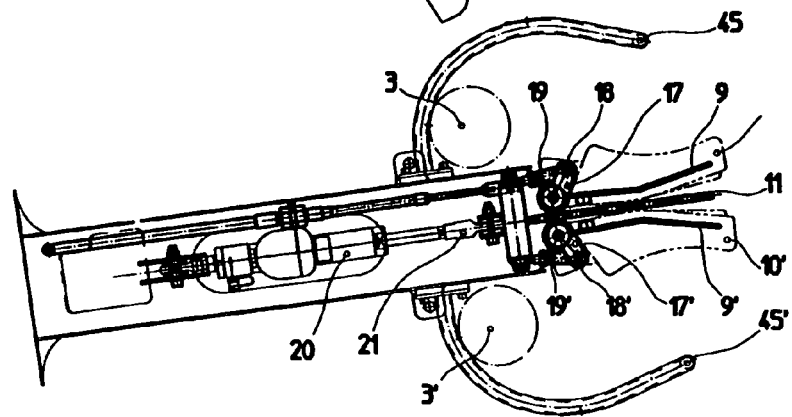
FIG. 8 is a partial section seen from above of the locking device depicted in FIG. 7.
Figure 9:
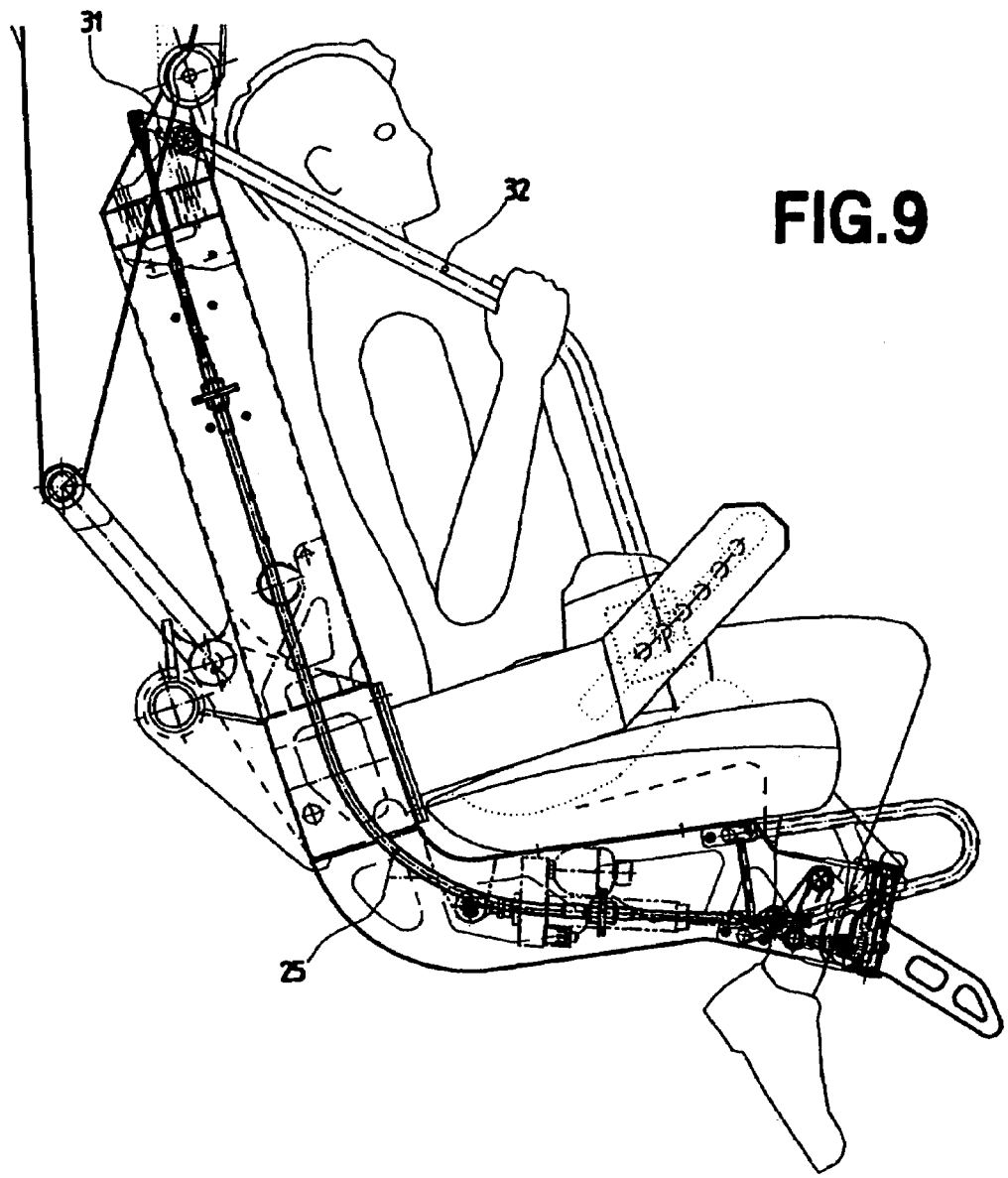
FIG. 9 is a side view similar to that of FIG. 7, the locking device being shown in the closed position.
Figure 10:
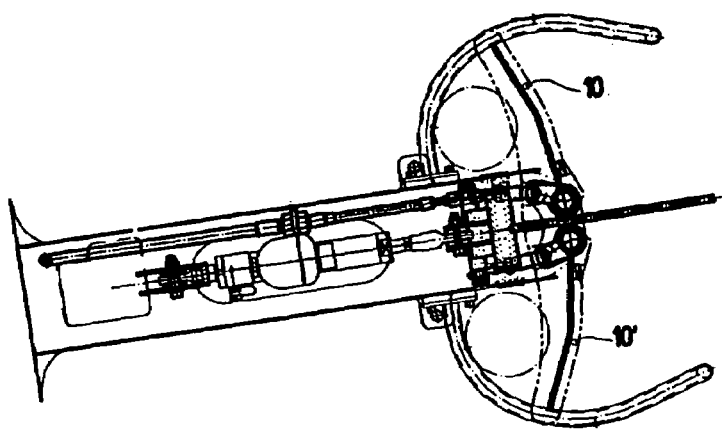
FIG. 10 is a partial section seen from above of the locking device depicted in FIG. 9.

Each of the ends of the bar 15 is connected by means of a link 16, 16' to one of the ends 18, 18' of a lever 17, 17' fixed to the frame 9, 9' of one of the flaps 10, 10' and the other end of which pivots about a shaft 19, 19' mounted at the end of the support 6 of the seat base. As shown in the drawings, the flaps 10, 10' can consist of a frame 9, 9' covered with polyurethane foam. When, as shown in FIGS. 3 and 4, the flaps are in the open position, the downward actuation of the pedal 11 gives rise to the movement of the shaft 15 towards the rear (towards the left of the drawing), the shaft 15 in its turn causing the movement of the links 16, 16', which in their turn cause the rotation of the levers 17, 17' about their shafts 19, 19', the consequence of which is the closure of the flaps 10, 10'. At the same time, the pivoting of the lever 12 towards the rear acts on the end 21 of the jack 20 in order to put it under compression.

The hydraulic locking jack 20 can for example be a jack with an electromagnetic valve which locks the fluids in the jack when the pedal 11 is in the low position, the flaps being closed. At this moment, the jack is under compression. Its subsequent release, by tilting its valve, will actuate a movement of the device in the opposite direction, causing the opening of the flaps.

In the two variant embodiments, which will now be described, the closure movement of the flaps is automatically controlled by the closure movement of the harness. For the rest, the functioning of the locking device is similar to that shown in FIGS. 1 to 6, the identical components being designated by the same reference figures.

According to a first variant embodiment depicted in FIGS. 7 to 10, the actuation of the lever 12 for the closing/opening of the flaps 10, 10' is effected not by means of the pedal 11 but by means of a cable 25 fixed for example at one of its ends to the end of the lug 14 fixed to the lever 12, and at its other end to a lever 31 fixed to the harness 32, so as to exert a traction on the lug 14 of the lever 12 during the closure movement of the harness or a thrust on this lug during the opening of the harness. The cable 25 is disposed inside a flexible sheath. It is for example possible to use a commercially available cable of the "push-pull" type. In this variant, the extension of the lateral parts 2, 2' of the seat in FIGS. 1 and 2 is replaced by external hoops 45 trapping the legs.

According to a second variant embodiment depicted in FIGS. 11 to 16, the assembly is arranged so that the closure of the flaps 10, 10' is effected automatically under the control of a closure movement of the harness. On the other hand, the opening of the flaps and the opening of the harness are controlled separately. For this purpose, the device has a mechanism for temporarily connecting the flaps to the harness.

Figure 11:
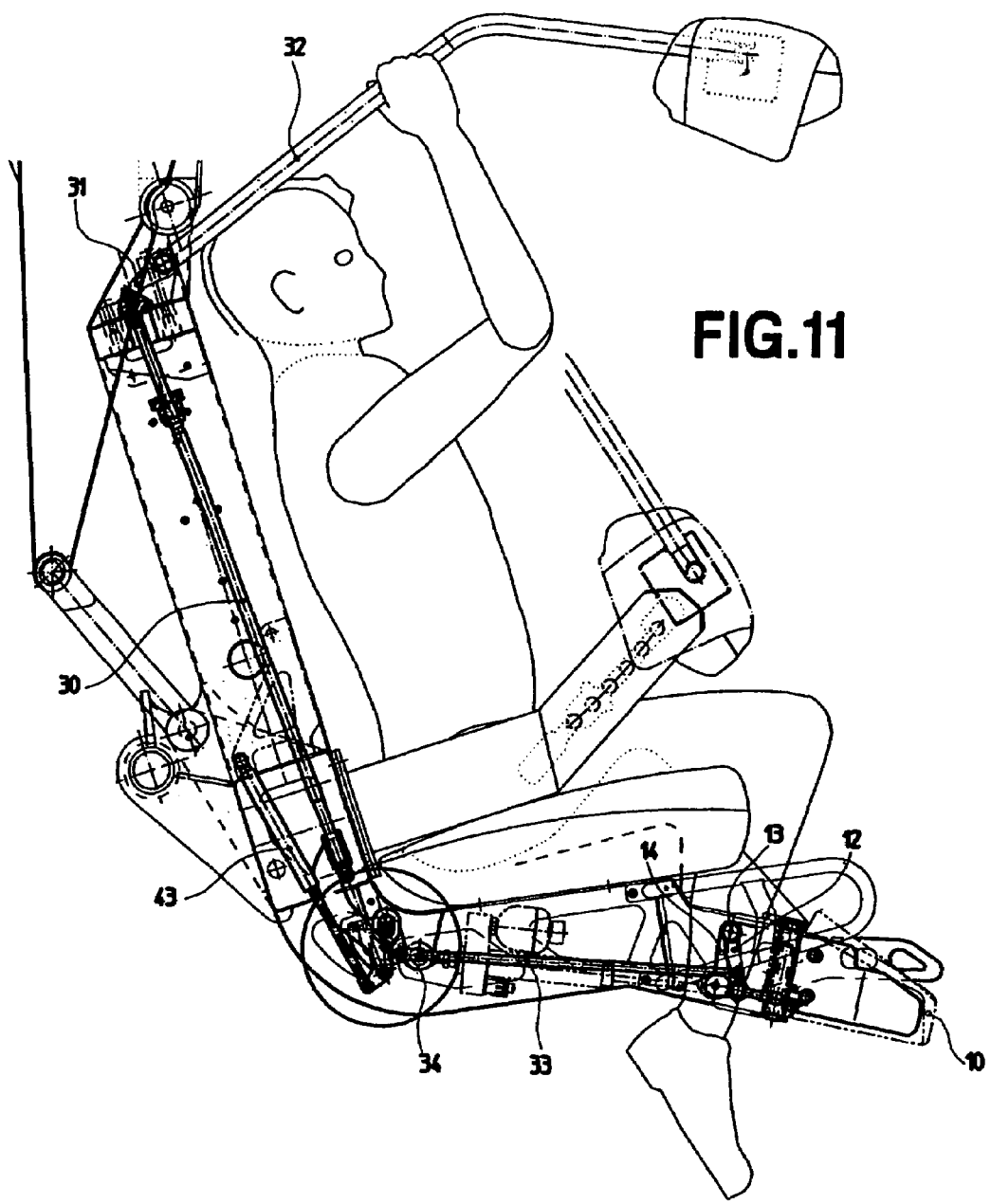
FIG. 11 is a side view partially in cross-section of a seat having a locking device according to the invention in the open position and illustrating a second variant embodiment of the opening/closing mechanism of the said device.
Figure 12:
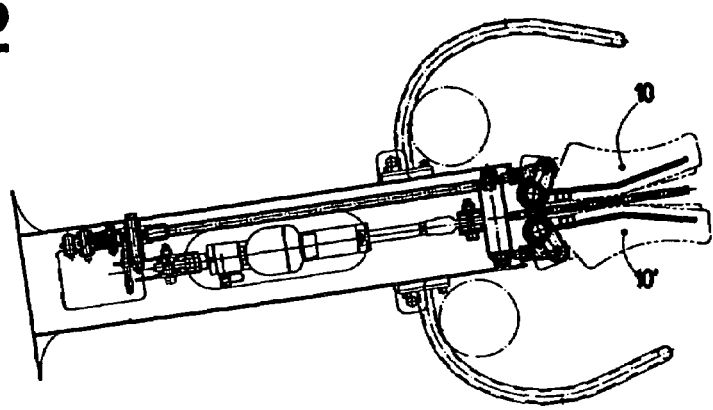
FIG. 12 is a view in partial section seen from above of the locking device depicted in FIG. 11.
Figure 13:
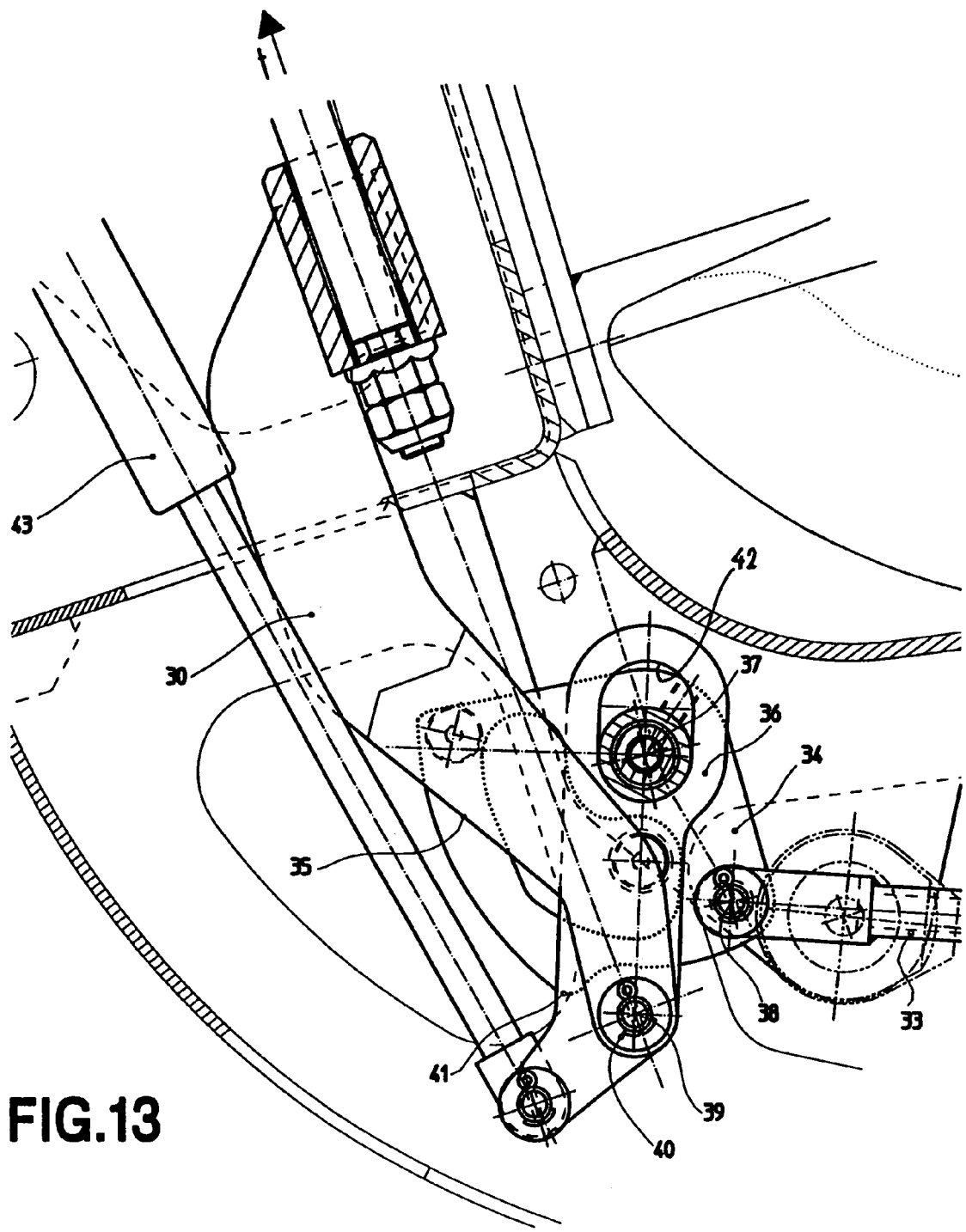
FIG. 13 is a detail view along A of the mechanism of FIG. 11, and FIGS. 14 to 16 are representations similar to those in FIGS. 11 to 13 but in which the locking device is in the closed position.
Figure 14:
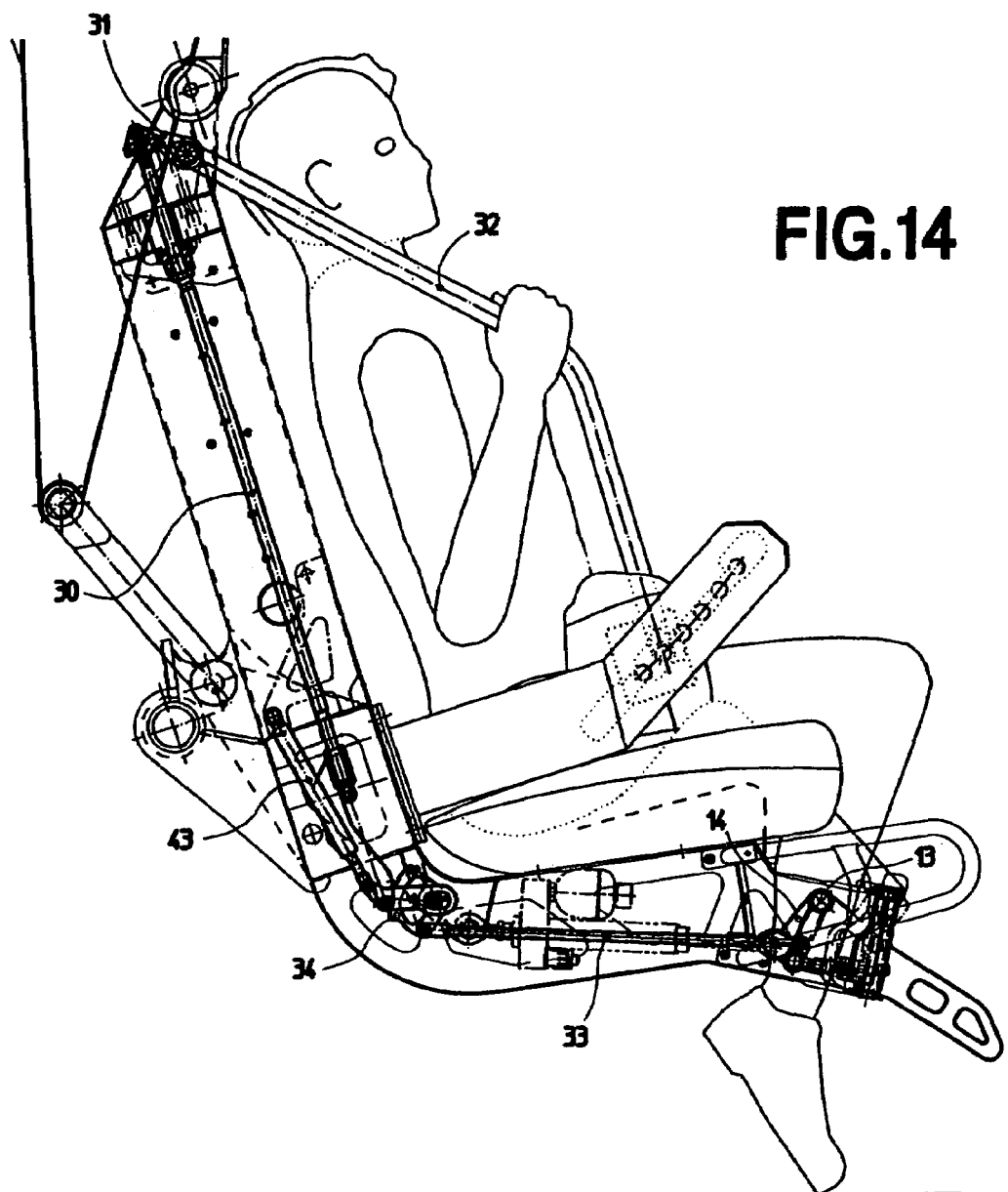
Figure 15:
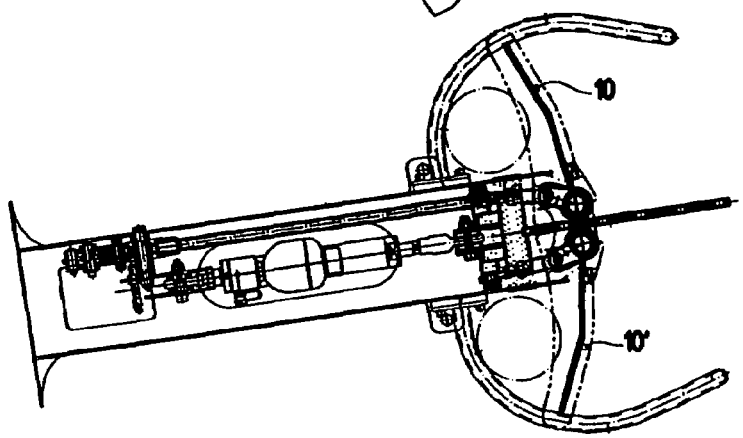

As depicted in FIGS. 11 and 14, the device comprises a control system including a connection linkage 30 fixed for articulation at one of its ends to a lever 31 secured to the harness 32 and a control bar 33, fixed by articulation at one of its ends to the end of the lug 14 fixed to the lever 12 making it possible to actuate the closing/opening movement of the flaps 10, 10'. The other respective ends of the connecting linkage 30 and of the control bar 33 are arranged to cooperate with an intermediate cam 34 arranged so as to allow the temporary fixing of the flaps 10, 10' to the harness 32, as depicted to a larger scale in the detailed FIGS. 13 and 16, the mechanism being shown in a position corresponding to the open position of the flaps in FIG. 13 and in a position corresponding to the closed position of the flaps in FIG. 16.

Figure 16:
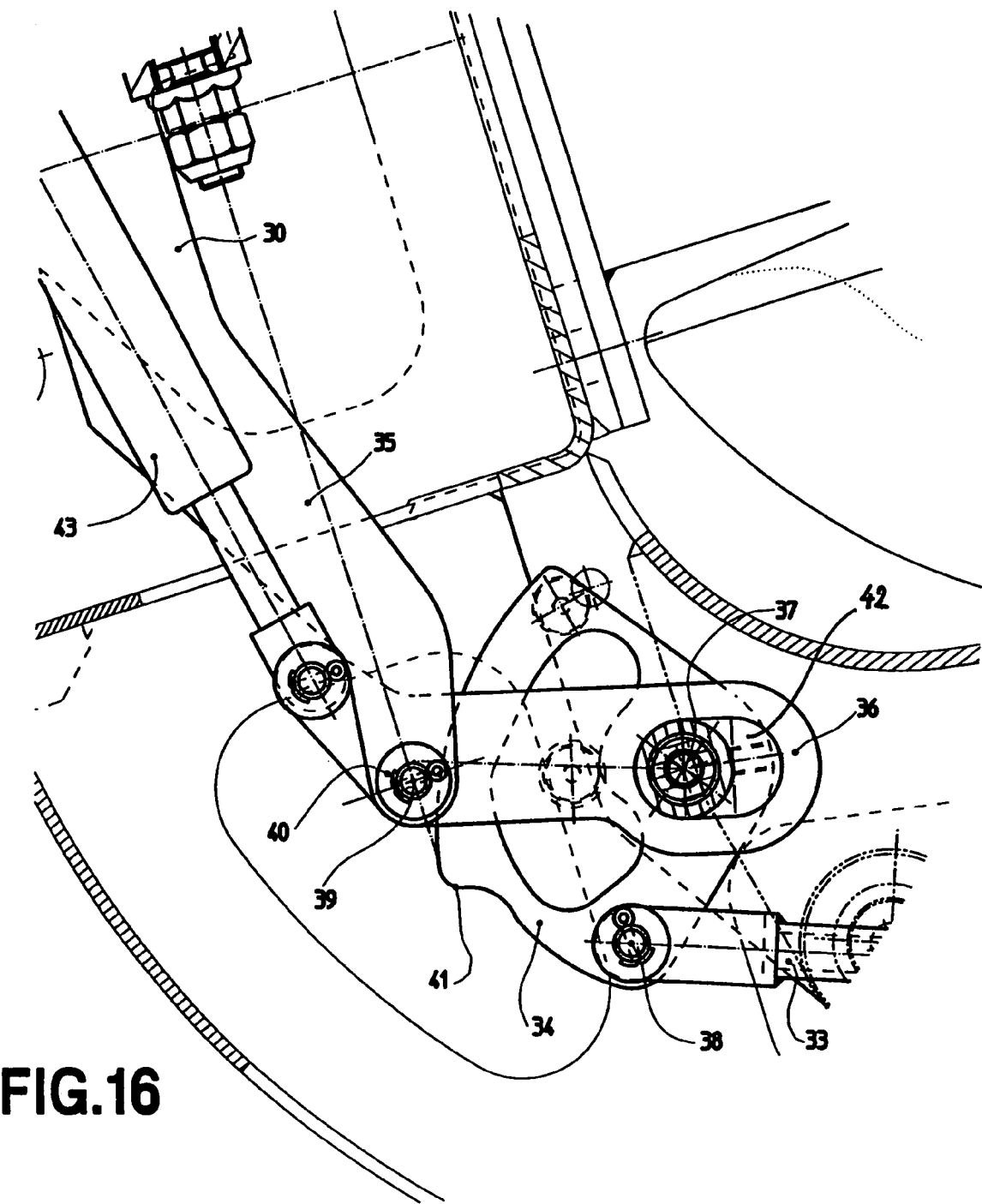

A description will now be given, in more detail, of the mechanism for temporarily fixing the flaps to the harness. As can be seen in FIGS. 13 and 16, the bottom end of the connecting linkage 30 has a part 35 in the form of a fork between the two arms of which the intermediate cam 34 and an actuating link 36 are disposed. The link 36 is mounted, at one of its ends, for articulation about a shaft 37 fixed to the cam 34, and close to its other end at the bottom end of the part 35 of the linkage 30 by means of a shaft 39. At this same end, the link 36 is also mounted for articulation at the end of a balancing spring 43 serving to counterbalance the inherent weight of the harness when it is in the open position. The cam 34 is in its turn mounted for articulation about a shaft 38 fixed to the end of the control bar 33. A roller 40 is mounted about the shaft 39 between the arms of the fork 36 so as to cooperate with a part 41, in the form of a nose, of the intermediate cam 34. The mechanism is arranged so that, when the passenger lowers the harness, the connecting linkage 30 effects an upward traction in the direction of the arrow t shown in FIG. 13, which causes a pivoting of the link 36 upwards, the roller 40 then coming to bear against the nose-shaped part 41 of the intermediate cam 34 and thereby causing the tilting of the intermediate cam 34 in the clockwise direction, which causes a movement of the control bar 30 towards the left, which causes the closure of the flaps 10, 10'. The piercing 42 of the link 36 at the point where it pivots about the shaft 37 is made oval so as to enable the roller 40 to pass round the nose-shaped part 41 of the cam 34 once the flaps 10, 10' are closed, as can be seen in FIG. 16, which then disconnects the movement of the harness from that of the flaps.

The system is thus arranged so that, when the harness has effected two thirds of its downward movement, the flaps are already completely closed and detected as such. At this precise moment, the flaps are locked in their closed position whilst, before awaiting this point, the passenger has every opportunity to open the flaps and harness once again simply by acting on the harness if he wishes to readjust his position in the seat. When the harness has effected two thirds of its travel and the flaps are locked in their closed position, the passenger continues the closure movement of the harness, then disconnected from the movement of the flaps as described above, until he reaches a point in the locking zone of the said harness corresponding to his morphology. The passenger is then ready to start. If the operator perceives, during his check, that the legs of the passenger are not correctly placed in the housings closed off by the flaps, or that the harness is badly adjusted, he can reopen and then close the harness or flaps independently of each other without losing the correct positions already acquired, the opening of the harness or flaps then taking place electrically. Should the operator open only the flaps, their closure will then be effected with the pedal 11.

When the train returns to the station, the opening of the flaps and the opening of the harness are controlled separately by means known per se which it is unnecessary to describe here. When the harness once again reaches its maximum opening position, the intermediate temporary connection cam 34 resets itself automatically under the effect of the balancing spring 43 and by virtue of its geometry. The seat is then ready to accept a new passenger.

Of course, the movement of opening/closing of the flaps can also be obtained by means of any other suitable means, such as for example by means of electric motors which may for example be controlled electronically or synchronized during the opening/closing movement of the harness.

The invention claimed is:

1. A passenger seat in an amusement park installation, said seat comprising a holding device provided with retaining means including a harness for holding the top of the body of the passenger in the seat and thereby encircling the body of the passenger so as to prevent any risk of ejection of the passenger during travel, said seat further comprising a support supporting a seat base fixed on said support, wherein said seat comprises a device for locking the legs of the passenger, wherein said device comprises two flaps mounted at an end portion of said support for articulation between an open position and a closed position, wherein said flaps co-operate with portions of said seat base so as to encircle the bottom portions of the legs of the seated passenger in said closed position.

2. A seat according to claim 1, having lateral parts projecting below the base and serving for the lateral holding of the legs of a passenger, the said lateral parts being arranged to cooperate with the flaps for locking the legs of the passenger.

3. A seat according to claim 1, further comprising a mechanism for actuating the movement of the flaps and having members acting on levers fixed to the flaps.

4. A seat according to claim 1, wherein said seat support comprises a central protrusion arranged to extend between the legs of the seated passenger and wherein said two laps are mounted articulated at a front end of said central protrusion.

5. A seat for the transportation of a passenger, in an installation for amusement parks, said seat comprising a support supporting a seat base fixed on said support, wherein said seat comprises a device for locking the legs of the passenger, wherein said device comprises two flaps mounted at an end portion of said support for articulation between an open position and a closed position, wherein said flaps co-operate with portions of said seat base so as to encircle the legs of the seated passenger in said closed position, further comprising a mechanism for actuating the movement of the flaps and having members acting on levers fixed to the flaps, wherein the mechanism for actuating the movement of the flaps comprises an actuation lever mounted for pivoting on the support of the base of the seat and fixed to a shaft, each ends of which are connected to the end of one of the said levers fixed to the flaps.

6. A seat according to claim 5, wherein the mechanism for actuating the movement of the flaps is controlled by a pedal fixed to the said actuation lever and arranged to control the movement of the said actuation lever.

7. A seat according to claim 5, wherein the mechanism for actuating the movement of the flaps is actuated by at least one electric motor.

8. A seat according to claim 7, wherein the said electric motor is controlled electronically during the opening/closing movement of a holding device for holding the passenger in the seat.

9. A seat according to claim 5, having a hydraulic jack for locking the flaps in the closed position, the said jack being made integral with the actuating lever, so that the pivoting of the said actuating lever causes the actuation of the jack.

10. A seat for the transportation of a passenger, in an installation for amusement parks, said seat comprising a support supporting a seat base fixed on said support, wherein said seat comprises a device for locking the legs of the passenger, wherein said device comprises two flaps mounted at an end portion of said support for articulation between an open position and a closed position, wherein said flaps co-operate with portions of said seat base so as to encircle the legs of the seated passenger in said closed position, further comprising a mechanism for actuating the movement of the flaps and having members acting on levers fixed to the flaps, and having control means for at least temporarily slaving the mechanism for actuating the movement of the flaps to a holding device for holding the top of the body of the passenger in the seat, so as to obtain the automatic closure of the flaps when closing the device for holding the top of the body of the passenger in the seat.

11. A seat according to claim 10, wherein the mechanism for actuating the movement of the flaps is controlled by means of a cable fixed to a lever for actuating the movement of the flaps and connected to a lever fixed to the holding device for holding the top of the body of the passenger in the seat.

12. A seat according to claim 10, wherein the said control means include an intermediate cam formed and arranged so as to allow the temporary connection of the mechanism actuating the movement of the flaps to the movement of the holding device holding the top of the body of the passenger during the closure movement of the latter device.

13. A seat according to claim 12, wherein the said control means include a first connection member articulated at one of its ends on a lever fixed to a holding device for holding the top of the body of the passenger and articulated at its other end through a first shaft on one of the ends of a link mounted for articulation at its other end on the cam, and a second connecting member articulated at one of its ends through a second shaft on the mechanism for actuating the movement of the flaps and articulated at its other end on the cam.

14. A seat according to claim 13, further having a roller mounted on said first shaft for articulating the said first connecting member on the said link, and arranged so as to cooperate with a nose-shaped part of the cam, so as to cause the pivoting of the said cam.

15. A seat according to claim 14, wherein the said link has, at the point of its articulation on the cam, a piercing formed so as to constitute a clearance on the said articulation enabling said roller to pass round the nose-shaped part of the cam once the flaps are closed.

16. A seat according to claim 10, having a hydraulic jack for locking the flaps in the closed osition, the said jack being made integral with the actuating lever, so that the pivoting of the said actuating lever causes the actuation of the jack.

* * * * *

UNITED STATES PATENT AND TRADEMARK OFFICE
CERTIFICATE OF CORRECTION

| | |
|---|---|
| PATENT NO. | : 7,204,559 B2 |
| APPLICATION NO. | : 10/021918 |
| DATED | : April 17, 2007 |
| INVENTOR(S) | : Berra |

It is certified that error appears in the above-identified patent and that said Letters Patent is hereby corrected as shown below:

Col. 5, claim 4, line 20: Replace "laps" and insert in lieu thereof -- flaps --.

Col. 6, claim 16, line 51: Replace "osition" and insert in lieu thereof -- position --.

Signed and Sealed this

Twenty-sixth Day of June, 2007

JON W. DUDAS
*Director of the United States Patent and Trademark Office*